United States Patent
Iizumi et al.

(10) Patent No.: US 7,621,250 B2
(45) Date of Patent: Nov. 24, 2009

(54) CUTTING TOOLS AND ROUGHENED ARTICLES USING SURFACE ROUGHENING METHODS

(75) Inventors: Masahiko Iizumi, Kanagawa (JP); Kimio Nishimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 51 days.

(21) Appl. No.: 10/572,726

(22) PCT Filed: Dec. 7, 2005

(86) PCT No.: PCT/IB2005/003694

§ 371 (c)(1),
(2), (4) Date: Mar. 21, 2006

(87) PCT Pub. No.: WO2006/061695

PCT Pub. Date: Jun. 15, 2006

(65) Prior Publication Data

US 2008/0244891 A1    Oct. 9, 2008

(30) Foreign Application Priority Data

Dec. 10, 2004   (JP) .............................. 2004-358712

(51) Int. Cl.
*C23C 4/02* (2006.01)
*B23B 27/18* (2006.01)
*F02F 1/00* (2006.01)

(52) U.S. Cl. .............................. 123/193.2; 29/888.061; 408/26

(58) Field of Classification Search .............. 29/888.06, 29/888.061, 458, 459; 123/193.2; 92/169.1; 408/26; 407/113, 114

See application file for complete search history.

(56) References Cited

U.S. PATENT DOCUMENTS

| | | | | |
|---|---|---|---|---|
| 3,657,078 A | * | 4/1972 | Schweikher | ................. 205/131 |
| 4,495,907 A | * | 1/1985 | Kamo | ..................... 123/193.2 |
| 4,597,939 A | * | 7/1986 | Neuhauser et al. | .......... 420/429 |
| 4,706,616 A | * | 11/1987 | Yoshimitsu | ............... 123/41.84 |
| 6,622,685 B2 | * | 9/2003 | Takahashi et al. | ......... 123/193.2 |
| RE39,070 E | * | 4/2006 | Stong et al. | .................. 428/546 |
| 2001/0023859 A1 | * | 9/2001 | Beck et al. | ............. 219/121.69 |
| 2003/0010201 A1 | | 1/2003 | Takahashi et al. | |

FOREIGN PATENT DOCUMENTS

| | | |
|---|---|---|
| DE | 101 47 219 | 4/2003 |
| JP | 2002-155350 | 5/2002 |
| JP | 2003-328108 | 11/2003 |

* cited by examiner

*Primary Examiner*—M. McMahon
(74) *Attorney, Agent, or Firm*—Global IP Counselors, LLP

(57) ABSTRACT

The disclosure relates to surface roughening methods in which a cutting tool having a radial cutting blade with first and second cutting edges is fed along a longitudinal axis of an article while rotating the cutting tool about the axis. The first cutting edge forms a first machined pattern of peaks and valleys on a surface of the article, and the second cutting edge removes at least a portion of the peaks to form roughened fracture surfaces in a second machined pattern defining an arrangement of grooves, corresponding to the valleys, separated by lands, corresponding to the roughened fracture surfaces. The disclosure also provides cutting tools useful in practicing the surface roughening methods. The disclosure further describes cylindrical articles having interior or exterior surfaces roughened using the methods. The methods, cutting tools and articles have applications including fabrication of cylinder blocks for internal combustion engines.

14 Claims, 7 Drawing Sheets

CUTTING TOOLS AND ROUGHENED ARTICLES USING SURFACE ROUGHENING METHODS

This application is a National Stage filing under 35 USC 371 of International Application No. PCT/IB2005/003694, filed Dec. 7, 2005, which claims priority to Japanese Patent Application No. 2004-358712, filed Dec. 10, 2004, the entire contents of each of which is incorporated herein by reference.

TECHNICAL FIELD

The invention relates to methods of surface roughening and cutting tools useful in surface roughening, as well as articles having roughened surfaces, particularly articles useful in manufacturing internal combustion engines for motor vehicle applications.

BACKGROUND

Internal combustion engines are increasingly fabricated using lightweight metals such as aluminum to decrease weight and achieve greater fuel efficiency. In particular, aluminum cylinder blocks have recently been fabricated with the internal surfaces of the cylinder bores spray coated with a material which acts to lubricate the cylinder bore and which aids the disposal of the engine's exhaust gases, for example, by catalyzing chemical reactions associated with the combustion process.

When the inner surface of a cylinder bore of a liner-less aluminum cylinder block is spray-coated, it is generally necessary to roughen the inner surface of the cylinder bore beforehand to enhance the adhesion of the spray coating. Surface roughening may be achieved, for example, using bead blasting, high pressure water jet blasting, or mechanical machining methods. However, these methods may not lead to a uniformly roughened surface, which can lead to adhesion failure of the coating to the cylinder wall. In addition, conventional machining methods can be time intensive and expensive, often requiring multiple pass machining steps to produce a cylinder bore surface having sufficient roughness to adhere the thermally sprayed coating.

Thus, a more reproducible and cost effective surface roughening method has been sought. The art continually searches for new methods of surface roughening, particularly roughening of cylindrical metal surfaces useful in fabricating internal combustion engines.

SUMMARY

In general, the disclosure relates to methods of surface roughening, cutting tools useful in practicing the surface roughening methods, and articles having surfaces roughened using the methods. More particularly, the disclosure relates to mechanical surface roughening methods useful for metal surfaces, more specifically, cylindrical metal surfaces. The surface roughening methods, cutting tools and articles, may be useful in manufacturing internal combustion engines for motor vehicle applications.

In one embodiment, the method includes forming a pattern of peaks and valleys on a surface of an article in a longitudinal axial direction with a leading edge of a rotary cutting head having the leading edge and a trailing edge, applying a stress to the peaks with the trailing edge of the cutting head, and fracturing the peaks to create a fracture surface defining lands separating the valleys defining grooves. In certain embodiments, each groove is symmetrical. In some embodiments, each groove defines a v-shape.

In additional embodiments, the method includes applying a coating to the roughened surface. In certain embodiments, the coating is applied using at least one of chemical vapor deposition, plasma deposition, thermal spray coating, and fluid spray coating. The coating may include an abrasion resistant material. In some embodiments, the coating includes a ceramic material or a metal.

In one exemplary embodiment, the method includes feeding a cutting tool comprising a cutting head further comprising a radial cutting blade with first and second cutting edges along a longitudinal axis of an article while rotating the cutting head about the axis. The first cutting edge forms a first machined pattern of peaks and valleys on a surface of the article, and the second cutting edge removes at least a portion of the peaks to form roughened fracture surfaces in a second machined pattern defining an arrangement of grooves, corresponding to the valleys, separated by the roughened fracture surfaces.

In another embodiment, a cutting tool comprises a rotary cutting head including at least one cutting blade extending radially outward from a cutting head. The cutting blade has a body, a first planar surface defining a first cutting edge shaped to cut a first pattern of peaks and valleys into a surface, and a second planar surface defining a fracture surface formation blade shaped to fracture the peaks and thereby create lands separating the valleys forming grooves in a second pattern. The cutting head may include at least one of a metal, a ceramic, or diamond.

In some embodiments, the cutting edge applies stress to a cross-section of each peak in an axial direction along a longitudinal axis of a surface at a starting location, and the fracture surface formation blade fractures each peak beginning at the starting location. In certain embodiments, the fracture surface formation blade fractures the entire cross section of each peak in the axial direction by applying the stress to the entire peak in a non-axial direction. In additional embodiments, the fracture surface formation blade includes an irregularly shaped part having a plurality of fracture surface formation blade projections and depressions adapted to form an irregularly shaped fracture surface defining a land including a plurality of fracture surface projections and depressions formed by fracturing the entire cross section of each peak. In exemplary embodiments, the lands are additionally roughened by the trailing edge of the cutting head.

In another embodiment, a surface roughening system comprises a means for roughening a surface further comprising a first cutting edge means for cutting a first pattern of peaks and valleys into the surface. The means for roughening further comprises a second cutting edge means for fracturing the peaks, a means for moving the means for roughening in an axial direction relative to a longitudinal axis of the surface, and a means for rotating the means for roughening in a radial direction relative to the surface. According to certain embodiments of this surface roughening system, rotating the means for roughening while feeding the means for roughening relative to the surface creates a roughened surface comprising a second pattern, wherein the second pattern includes a plurality of lands created by fracturing the peaks, each land positioned adjacent to a groove corresponding to a valley in the first pattern.

In yet another embodiment, a cylindrical body comprises a machine roughened surface including a substantially helical pattern of grooves separated by substantially uniform roughened surface regions defining lands. In some embodiments, the cross section of the grooves is substantially symmetrical and has a v-shape. In certain embodiments, the roughened surface is an interior surface of the cylindrical body. In some embodiments, the cylindrical body may be formed from a nonferrous metal. In additional embodiments, a coating is applied to the surface overlaying the lands and grooves.

In certain embodiments, the cylindrical body is a cylinder block for an internal combustion engine. In exemplary embodiments, the article includes at least one cylinder liner positioned in the cylinder bore of the engine. The cylinder liner may include an outer peripheral surface roughened by forming thereon the pattern of lands and grooves, before casting the cylinder liner into a cylinder bore of an internal combustion engine.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
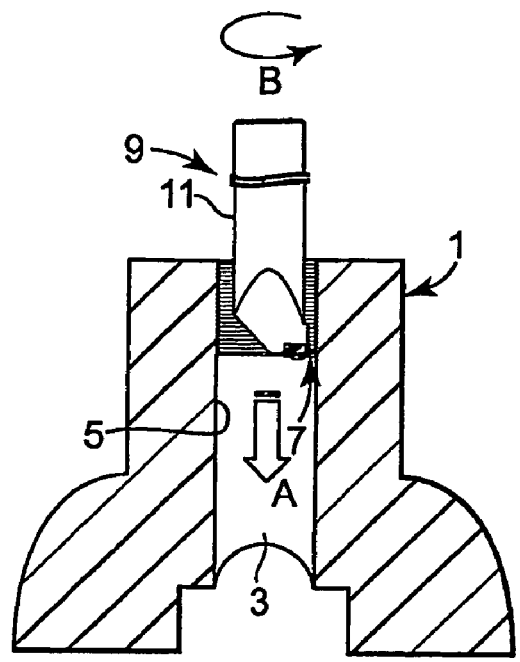
FIG. 1 is a cross-sectional view of a cylinder block showing a surface roughening method.

The present invention is generally related to a surface roughening method in which a cutting tool is moved along a longitudinal axis of a body. As the cutting tool rotates about the longitudinal axis of the body, a first cutting edge extending radially outward a first distance from a cutting head of the cutting tool moves relative to the body and cuts on a surface of the body a first machined pattern of peaks and valleys. A second cutting edge extending radially outward a second distance from the cutting head of the cutting tool applies stress on the peaks in the first pattern, which fractures the peaks to create fractured surfaces and form a second machined pattern in the on the surface of the body. In the second machined pattern the fractured surfaces are lands separated by grooves, which correspond to the valleys remaining from the first machined pattern. By fracturing the peaks using the second cutting edge of the cutting tool, the lands of the second machined pattern are more uniform and symmetrical compared to machining techniques in which the fracture surface is formed by cutting chips generated as the machining proceeds.

The surface roughening method according to some embodiments of the present invention may thus lead to more uniformly shaped surface roughness patterns, which increases the adhesion strength and uniformity of a thermal spray coating applied to the roughened surface. The roughened surface may be used in, for example, an internal surface of a cylinder bore of an internal combustion engine. In additional embodiments, the adhesion strength between two articles may also be increased using the surface roughening method to roughen an external peripheral surface of, for example, a cylinder liner that is to be inserted as a sleeve into a cast cylinder block.

Various exemplary embodiments of the present invention will now be described with reference to the drawings. By specifying particular steps in the present disclosure, it is not meant to limit the invention to performing those steps in a particular order unless an order is specified. Similarly, listing particular steps in a particular order is not intended to preclude intermediate steps or additional steps, as long as the enumerated steps appear in the order as specified. Certain materials and articles suitable for practicing the present invention are disclosed; however, additional equivalent materials and articles may be substituted in practicing the invention, as known to one skilled in the art. The detailed description of the present invention is not intended to describe every embodiment or each implementation of the present invention. Other embodiments and their equivalents are within the scope of the present invention.

In the particular examples described below and in FIG. 1, the article to be surface roughened is a cylinder bore 3 of a cylinder block 1. The bore 3 has a cylindrical body, and a cylinder bore inner surface 5 that is to be roughened. However, the surface to be roughened need not be an inner surface, but may be an outer surface. The article to be roughened using the surface roughening methods described herein is not limited to a cylinder bore part, but may, for example, be a pipe, a cylindrical bearing surface (e.g. a boss within a tie rod or other bearing surface), a transmission, and the like. In addition, the article need not have a cylindrical shape.

The article may be formed using any number of methods; however, die-casting is a presently preferred method. The article may generally be formed from a metal, for example, a nonferrous metal alloy such as an aluminum alloy (e.g. ADC 12 manufactured by Nissan Motors Company, Tokyo, Japan).

However, other machinable materials (e.g. rigid plastics and the like) may be used in practicing the invention according to some embodiments.

FIG. 1 is a cross-sectional view of a cylinder block 1 of an engine showing a surface roughening method, cutting tool and article according to various embodiments of the present invention. Once the cylinder bore inner surface 5 is roughened by means of the method described below, a coating material may be applied to the roughened cylinder bore inner surface 5 to form a coating. In some embodiments, the coating is applied using at least one of chemical vapor deposition, plasma deposition, thermal spray coating, and fluid spray coating. Preferably, the coating is applied using thermal spray coating. The coating may include an abrasion resistant material. In some embodiments, the coating includes a ceramic material or a metal. Preferably, the thermal spray coating material includes a ferrous metal.

Figure 2:
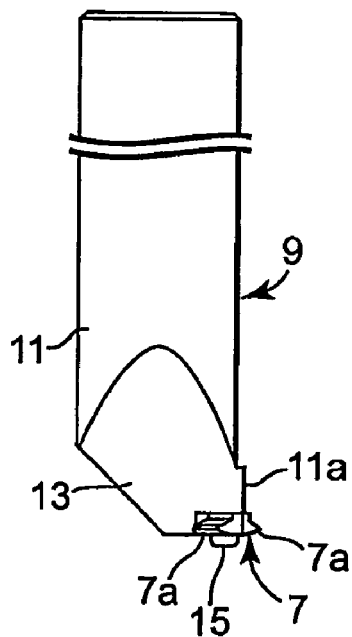
FIG. 2 is a front view of an exemplary cutting tool useful in practicing the surface roughening method of FIG. 1.
Figure 3:
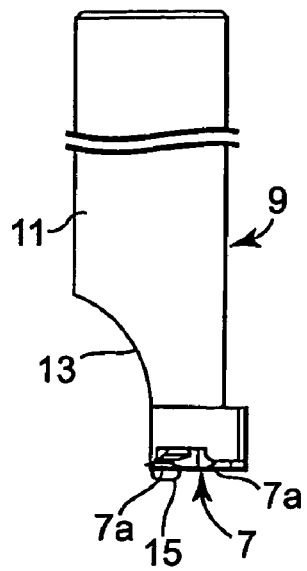
FIG. 3 is a side view of the cutting tool of FIG. 2.
Figure 4:
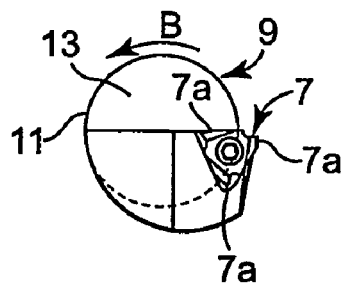
FIG. 4 is a bottom view of the cutting tool of FIG. 2.
Figure 5:
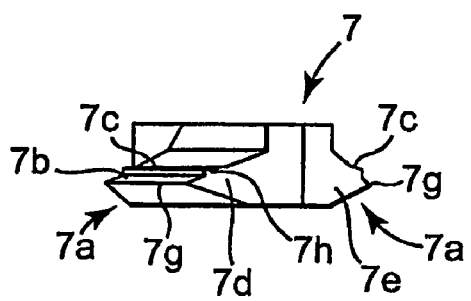
FIG. 5 is an enlarged perspective view of the cutting head of the exemplary cutting tool of FIG. 2.

As shown in FIG. 2, a cutting tool including a boring bar 9 terminating at a radial cutting head 7 may be used to roughen the surface of the cylinder bore inner surface 5. FIG. 3 is a side view of the cutting tool of FIG. 2, and FIG. 4 is a bottom view of the cutting tool of FIG. 2. On the boring bar 9, a notch 13 that is used to form a concave surface is formed on the side of the tip of the lower part of a tool body 11 in FIG. 2, and the cutting head 7 is fixed by fastening with a bolt 15 at the end of the tool body 11 that protrudes from the notch 13. FIG. 5 is an enlarged perspective view of the cutting head 7 shown in the FIG. 2, and FIG. 6 is an overhead view of FIG. 5.

In one exemplary method of surface roughening, the cutting head 7 moves along the longitudinal axis A of the cylinder 3 (FIG. 1). The tool body 11 rotates about the longitudinal axis B (FIG. 1), and a single cutting blade 7a protrudes outward from a side face 11a of the tool body 11 to cut the surface 5 into a substantially helical thread-like pattern to roughen the surface. However, the surface roughening method may also be performed by holding the boring bar 9 may in a fixed state and moving the cylinder block 1 axially and rotationally.

Figure 5A:
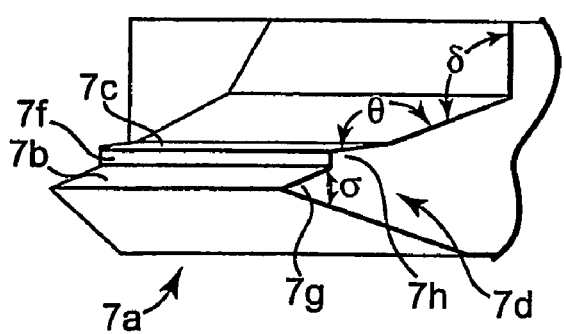
FIG. 5A is an enlarged perspective view of the cutting edges on the cutting head of the exemplary cutting tool of FIG. 2.
Figure 6:
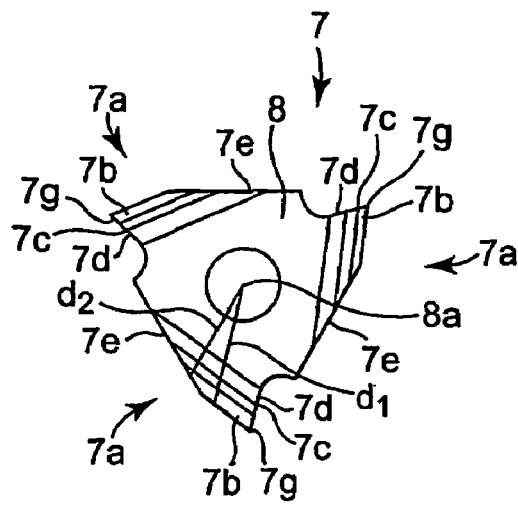
FIG. 6 is an overhead view in perspective of the cutting head of FIG. 5.

As shown in FIGS. 5, 5A and 6, this exemplary cutting head 7 includes three cutting blades 7a extending radially outward from the body 8 of the cutting head at even angular intervals. In certain embodiments, each of the three cutting blades 7a can be removed when worn from cutting, and by attaching them on the tool body 11 again while rotating the cutting head body 8 120 degrees from the state in FIG. 4, another fresh cutting blade 7a can be used. It should be emphasized that the cutting head configuration shown in FIGS. 5, 5A and 6 is only exemplary, and many different cutting tool shapes may be used, as long as a first cutting edge of the cutting blade makes a pattern of peaks and a second cutting edge fractures the peaks to form fracture surfaces.

Referring to FIGS. 5, 5A and 6, each cutting blade 7a includes a first planar region 7b oriented at an obtuse angle δ below a plane formed by the body 8 of the cutting head 7. The first planar region 8b extends radially outward a first distance $d_1$ from a center 8b of the body 8 and intersects with a first rake face 7d to form a first cutting edge 7g. The angle σ between the first planar surface 7b and the first rake face 7d is selected to form a pattern of peaks and valleys in the surface to be cut. The angle σ is typically selected such that each machined valley in the surface 5 is symmetrical, and in a preferred embodiment each valley has a cross sectional v-shape. The first planar region 7b extends from the first rake face 7d at a leading edge of the cutting blade 7a, which is substantially normal to the planar region 7b, to a second rake face 7e at a trailing edge of the cutting blade 7a, which is also substantially normal to the planar region 7b. A second planar region 7c is formed at an acute angle θ above the first planar region 7b. The second planar region 7c extends radially outward a second distance $d_2$ from the center 8b of the body 8 and intersects with the first rake face 7d to form a second cutting edge 7h. The second planar region 7c also extends from the first leading edge rake face 7d to the second trailing edge rake face 7e. The second planar region 7c is substantially normal to an end face 7f, which may optionally include a surface pattern.

In operation, the first cutting edge 7g cuts into the surface 5 of the cylindrical body a first machined pattern of peaks and valleys, and the first machined pattern will typically be a substantially helical thread-like pattern. The first cutting edge 7g preferably has an angle σ selected such that each machined valley in the surface 5 is symmetrical, and in a preferred embodiment each valley has a v-shape when viewed in cross section. The second cutting edge 7h then applies stress to the peaks of the first substantially helical pattern, which fractures the peaks and forms a second machined pattern in the surface 5. The second machined pattern is also typically a substantially helical thread-like pattern. In the second machined pattern the fractured peaks create fracture surfaces separated by grooves, which are the valleys remaining from the first machined pattern.

The cutting head 7 may be fabricated from any number of materials, but generally includes at least one of a metal, a ceramic material, or diamond. The cutting blades 7a generally include at least one metal selected from titanium, tungsten, cobalt, nickel, iron, or aluminum. The cutting edge 7a and in particular, the fracture surface formation second cutting edge 7h, may include at least one ceramic material selected from one or more of silicon nitride, silicon carbide, aluminum oxide, silicon dioxide, or titanium nitride. Preferably, the cutting blades 7a are harder than the surface of the material to be roughened.

In some embodiments, the disclosure provides a surface roughening system, including a means for roughening a surface (e.g. cutting head 7), further including a first cutting edge means (e.g. first cutting edge 7g) for cutting a pattern of peaks and valleys into the surface to form the first substantially helical pattern, and a second cutting edge means (e.g. fracture surface second cutting edge 7h) for fracturing the peaks to form the second substantially helical pattern including roughened lands interspersed with grooves; a means for feeding (not shown in FIG. 1); and a means for rotating (not shown in FIG. 1).

Figure 7:
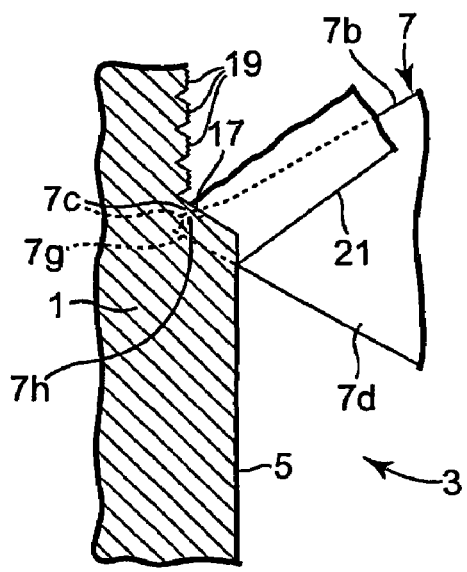
FIG. 7 is an enlarged cross-sectional view showing a state of cutting with a cutting blade that is part of the cutting head of FIG. 5.

As shown in FIG. 7, which shows cutting using the cutting blade 7a in which the parts shown in FIGS. 5, 5A and 6 are enlarged, the first planar region 7c with the second cutting edge 7h applies stress on a peak 17 remaining from the first machined pattern formed by the first cutting edge 7g on the cylinder bore inner surface 5. The second cutting edge 7h removes a portion of the peak 17 and forms a fracture surface 19. A cutting chip 21 is generated by the cut with the cutting blade 7a, and the cutting head 7 is assumed to move out of the plane of the paper in FIG. 7 and vertically upward toward the viewer.

In the perspective of FIG. 7, the projecting part 7c and second cutting edge 7h of the cutting blade 7a apply stress beneath the peak 17 and the cutting blade 7a moved vertically upward toward the viewer and out of the paper to fracture the peak 17 and form a fracture surface 19. Using the above described cutting tool 7a make the peak 17 relatively easy to fracture in a uniform and consistent way, and the shape of the fracture surface 19 is more uniform and symmetrical compared to conventional processes in which the fracture surface is randomly formed by cutting chips produced by the first cutting edge of the cutting blade. In addition, since the peak 17 is easily fractured using the projecting part 7c, the cutting stress applied on the cutting blade 7a is reduced, which would be expected to extend the life of the cutting head 7. Preferably, as shown in FIG. 7, the entire cross section of each peak in the axial direction is fractured by applying the stress to each peak in a non-axial direction.

Since the shape of the fracture surface 19 is more uniform and symmetrical as described above, the coating applied to the surface 5 adheres more strongly and more uniformly, which enhances the durability of the coating.

Figure 8:
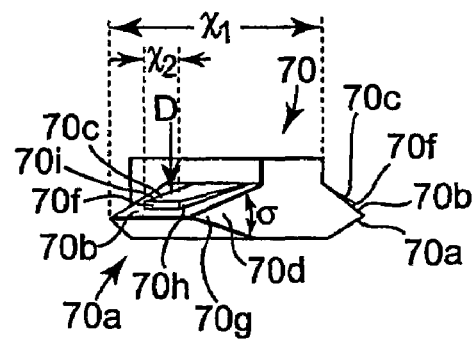
FIG. 8 is a front view of a cutting tool showing another exemplary embodiment of a cutting head.

FIG. 8 is a perspective view of a cutting head 70 corresponding to FIGS. 5, 5A and 6 showing another embodiment of the present invention. This exemplary cutting head 70 again includes three cutting blades 70a each extending radially outward at even angular intervals.

Each cutting head 70a includes a first planar region 70b oriented at an obtuse angle δ below a plane formed by the body 80 of the cutting head. The first planar region 80b extends radially outward a first distance $d_1$ from a center 80b of the body 80 and intersects with a first rake face 70d to form a first cutting edge 70g. The first planar region 70b extends from the first rake face 70d at a leading edge of the cutting blade 70a, which is substantially normal to the planar region 70b, to a second rake face 70e at a trailing edge of the cutting blade 70a, which is also substantially normal to the first planar region 70b. A second planar region 70c is formed at an acute angle θ above the first planar region 70b. The second planar region 70c extends radially outward a second distance $d_2$ from the center 80b of the body 80. A second cutting surface or rake face 70h, substantially normal to the second planar region 70c, is formed at an intersection with an end face 70f, which is also substantially normal to the second planar region 70c. The distance $x_2$ between the second cutting surface or rake face at the leading edge of the second planar region 70c and a rake face 70i at the trailing edge of the second planar region 70c is less than the distance $x_1$ between the first rake face 70d at the leading edge of the first planar region 70b and the second rake face 70e at the trailing edge of the first planar region 70b.

Figure 9:
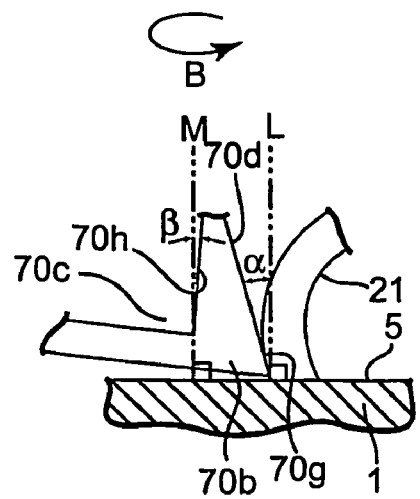
FIG. 9 is a cross-sectional view showing an enlargement of a part D in FIG. 8.

FIG. 9 shows view D corresponding to the arrow in FIG. 8, wherein, a rake face 70d of the cutting blade 70a is oriented at an angled α with respect to a direction opposite to the rotational direction B of the cutting head 7 in FIG. 4 and with respect to a line L normal to the cylinder bore inner surface 5. The orientation of the rake face 7d in FIG. 5A may also be selected to have the same orientation as the rake face 70d in FIG. 9. At the same time, a rake face 70h adjacent the second planar surface part 70c is oriented at an angle β in the rotational direction B with respect to a line M drawn orthogonal to the surface 5 to be roughened.

Figure 10:
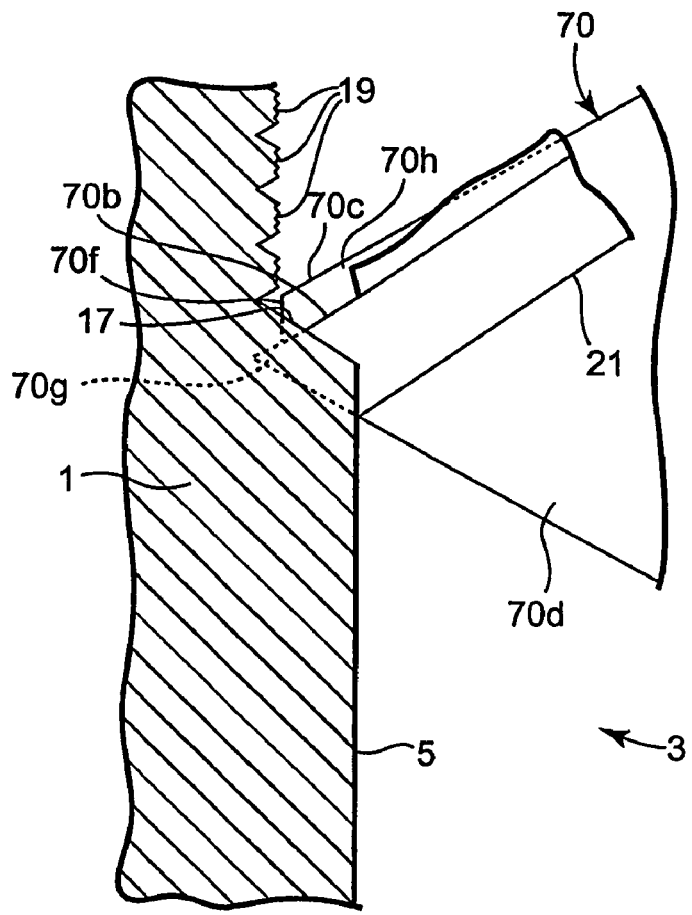
FIG. 10 is an enlarged cross-sectional view showing the state of cutting with a cutting blade that is part of the cutting head of FIG. 8.

FIG. 10 illustrates a cutting procedure using the cutting head of FIG. 8. The first cutting edge 70g cuts into the surface 5 of the cylindrical body a first machined pattern of peaks and valleys, which is preferably a substantially helical thread-like pattern. The first cutting edge 70g is typically shaped at an angle σ with respect to the first rake face 70d such that each machined valley in the surface 5 is symmetrical, and in a preferred embodiment each valley has a v-shape when viewed in cross section. The second cutting edge 70h then applies stress to the peaks of the first machined pattern, which fractures the peaks and forms a second machined pattern in the surface 5, which also substantially helical. In the second machined pattern the fractured peaks form a patterns of roughened lands separated by grooves, which are the valleys remaining from the first machined pattern.

The second cutting edge 70h preferably removes the entire cross direction of the peak 17 (vertical direction in FIG. 10 and up out of the paper toward the viewer) to form a fracture surface 19 that is almost the same as that shown in FIG. 7. The end face 70f that is located at the tip of the second planar region 70c then contacts the fracture surface 19 after the peak 17 is removed. Since the rake surface 70h of the projecting part 70c is oriented at an angle β in the rotational direction B with respect to a line M normal to the surface 5, while the rake surface 70d is oriented at an angle α in the direction opposite the rotational direction B with respect to ah line L normal to the surface 5, the removal of the peak 17 may be more reliably performed compared to a tool design in which the rake surface 70h is oriented in the same direction as the rake surface 70d.

Figure 11:
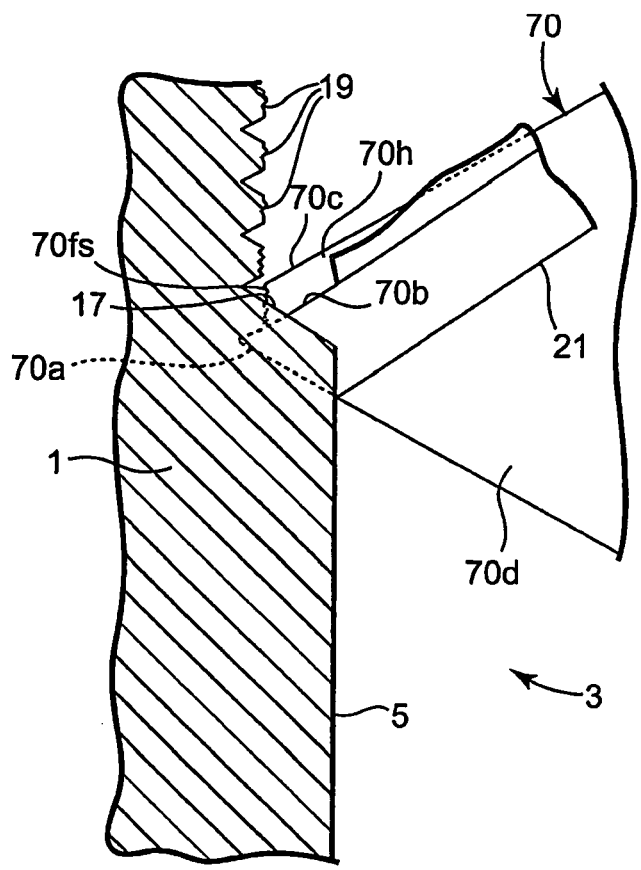
FIG. 11 is a cross-sectional view showing the state of cutting with a cutting head that includes an irregularly shaped fracture surface formation blade that additionally roughens a fracture surface.

In certain presently preferred embodiments, the trailing edge of the cutting head may also roughen the surface of each land after the peak is fractured and removed, which increases the surface area of the land and may enhance adhesion of the coating to the land. FIG. 11 is a cross-sectional view corresponding to FIG. 10 showing an example of a cutting head 70 useful in practicing this presently preferred embodiment. In this example, an irregularly shaped part with projections and recessions which makes the irregularly shaped fracture surface 19 with projections and recessions is provided on an end face 70fs in the second planar surface 70c of the cutting head 70, which contacts the fracture surface 19 after the peak 17 is removed by the second cutting surface 70h. The roughened surface 70fs creates a finer surface texture on the fracture surfaces 19, which enhances the surface area and would be expected to increase the adhesion of the coating.

Figure 12:
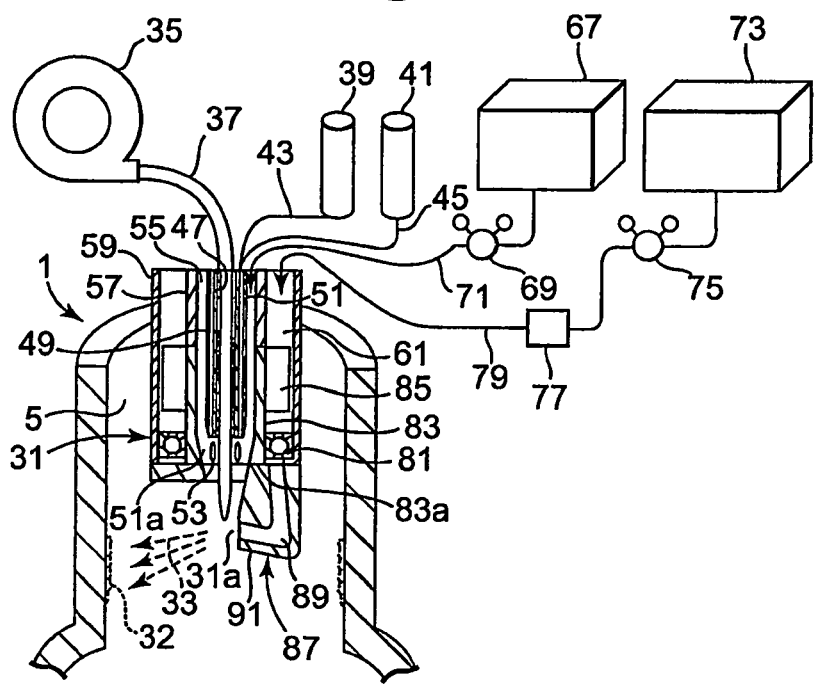
FIG. 12 is a block diagram showing an outline of exemplary thermal spraying equipment useful in forming a thermal spray coating on a cylinder bore inner surface that is roughened.

FIG. 12 is a block diagram showing an outline of exemplary thermal spraying equipment useful in forming a roughened surface on a cylinder bore inner surface according to another embodiment of the present invention. FIG. 12 illustrates an schematic of the thermal spraying equipment used to form a thermal spray coating after roughening the surface on the cylinder bore inner surface 5 of the cylinder block 1. This exemplary thermal spraying equipment inserts a gas wire thermal spraying gun 31 into the center of a cylinder bore, and a fused ferrous metallic material of a thermal spraying material is sprayed in the form of droplets 33 from a thermal spraying port 31a to form a thermal spray coating 32 on the cylinder bore inner surface 5.

The thermal spraying gun 31 may be fed a supply of melting wire 37 of a ferrous metallic material as the material for thermal spraying from a melting wire feeding machine 35, and further may receive a supply of a fuel gas and oxygen from a fuel gas cylinder 39 which stores fuel such as acetylene, propane, ethylene, and the like; and from an oxygen cylinder 41 which stores oxygen and delivers oxygen gas, through piping 43 and 45 respectively. The melting wire 37 may be fed to the thermal spraying gun 31 from the upper end to the lower side of a melting wire feed hole 47 that vertically penetrates the central part of the gun. In addition, the fuel and oxygen may be supplied to a gas guide channel 51 that is formed by vertically penetrating a cylindrical part 49 located on the outside of the melting wire feed hole 47. This mixed gas supply of fuel and oxygen may flow out from a lower end opening 51a of the gas guide channel 51 in FIG. 12 and when ignited, forms a combustion flame 53.

An atomized-air channel 55 may be provided on the outer circumference of the cylindrical body 49, and an accelerated-air channel 61 formed between a cylindrical bulkhead 57 and a cylindrical external wall 59 is provided outside of the atomized-air channel. Atomized-air flowing through the atomized-air channel 55, may be pre-heated by the combustion flame 53, and fed forward (downward in FIG. 12) in order to allow the perimeter part to cool. Atomized-air may also be fed forward to the fused melting wire 37. At or about the same time, accelerated-air flowing through the accelerated-air channel 61 is also fed forward, and feeds the melted melting wire 37 to the cylinder bore inner surface 3 as droplets 33 so that it intersects with the feed direction to form the sprayed coating 32 on the cylinder bore inner surface 5.

Atomized-air may be supplied to the atomized-air channel 55 from an atomized-air supply source 67 through an air supply pipe 71 with a pressure regulator 69. At or about the same time, accelerated-air is supplied to the accelerated-air channel 61 from an accelerated-air supply source 73 through an air supply pipe 79 with a pressure regulator 75 and a micromist filter 77. The bulkhead 57 between the atomized-air channel 55 and the accelerated-air channel 61 includes of a rotary cylinder part 83 which can be rotated through a bearing 81 of the external wall 59 at the tip of the lower side in FIG. 12. A rotary wing 85 that is located in the accelerated-air channel 61 is provided on the upper outer circumference of this rotary cylinder part 83. When accelerated-air flowing through the accelerated-air channel 61 works on the rotary wing 85, the rotary cylinder part 83 rotates.

A tip part 87 that rotates integrally with the rotary cylinder part 83 may be fixed on the tip (lower end) 83a of the rotary cylinder part 83. A projecting part 91 with a spout channel 89 that communicates with the accelerated-air channel 61 through the bearing 81 is provided on one part of the peripheral edge of the tip part 87, and the thermal spraying port 31a which spouts out droplets 33 is provided at the tip of the spout channel 89. By rotating the tip part 87 with the thermal spraying port 31a integrally with the rotary cylinder part 83, while moving the thermal spraying gun 31 in the axial direction of the cylinder bore, a sprayed coating 32 is formed on almost the entire area of the cylinder bore inner surface 5.

Although in each of the embodiments explained above, surface roughening is performed at the internal surface of cylindrical bodies such as with the cylinder bore inner surface 5, another embodiment explained below illustrates increasing the bonding strength of a cylinder liner 103 with a cylinder block 101 by roughening the outer peripheral surface 103a of the cylinder liner 103, that is the outer surface of a cylindrical body, by means of a similar method to the cylinder bore inner surface 5 in each of the embodiments described above. This embodiment may be particularly useful when the cylinder liner 103 is made of, for example, cast iron, and the cylindrical body is cast into a cylinder block 101 that is made of, for example, an aluminum alloy, as shown in FIG. 13.

Figure 13:
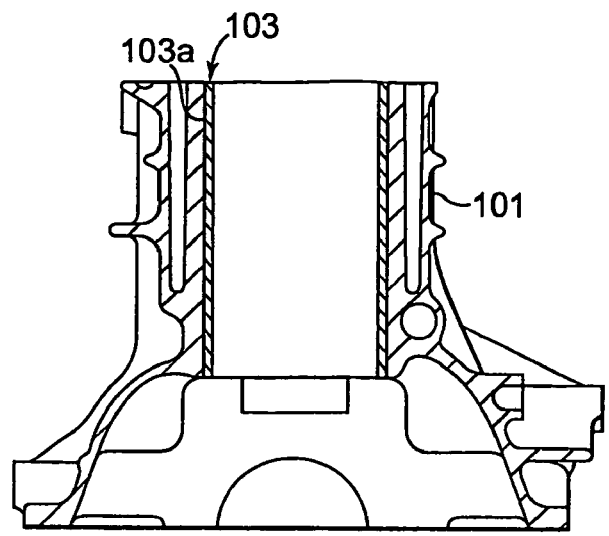
FIG. 13 is a cross-sectional view of an exemplary surface roughened cylinder block (e.g. made of an aluminum alloy) for an internal combustion engine in which a cylinder liner (e.g. made of cast iron) is integrally molded.
Figure 14A:
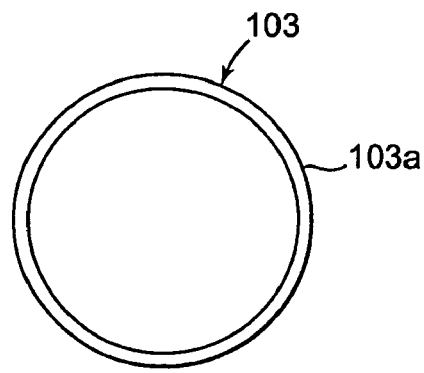
FIG. 14A is an overheard view of the cylinder liner in FIG. 13.
Figure 14B:
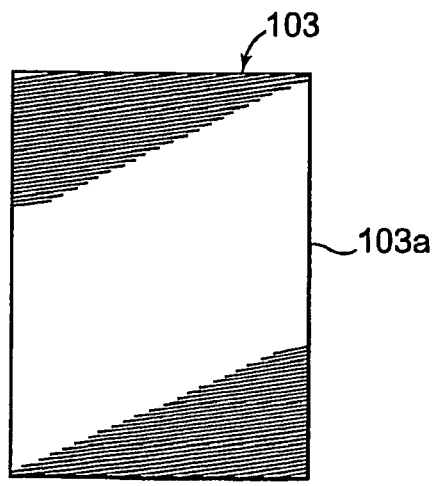
FIG. 14B is a perspective view of FIG. 14A showing the roughened exterior peripheral surface of the cylinder liner of FIG. 13.

FIG. 14A is a top view of the cylinder liner 103 in FIG. 13, and FIG. 14B is a plane view of FIG. 14A showing the roughened exterior peripheral surface 103a of the cylinder liner 103 of FIG. 13. The outer peripheral surface 103a of the cylinder liner 103 is cut into a first substantially helical pattern of peaks and valleys using the cutting blade 7a (70a) of the boring bar 9 with the cutting head 7 or 70 as shown in FIG. 2. The peaks 17 of this first substantially helical pattern are fractured by the leading edge 7h (70h) of the projection formed by the second planar surface 7c (projecting part 70c) to form a pattern of grooves interspersed with fracture surfaces 19 as shown in FIG. 7. In this manner, a cylinder liner 103 can be obtained in which the outer peripheral surface 103a is roughened as shown in FIG. 14 (a).

Figure 15:
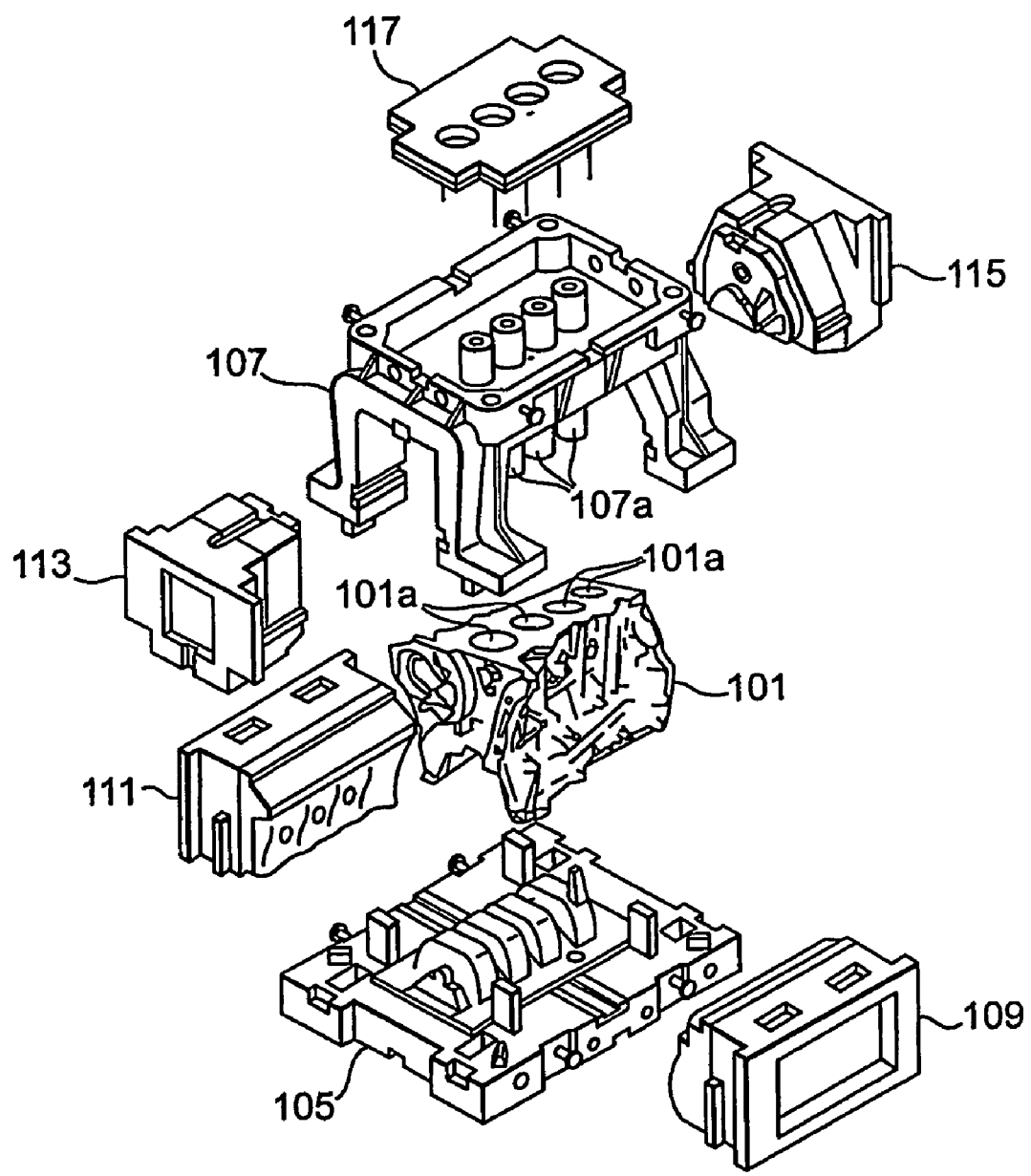
FIG. 15 is an exploded perspective view of exemplary casting molds used to cast and form a cylinder block for an internal combustion engine as shown in FIG. 13.

In another embodiment shown in FIG. 15, the cylindrical cylinder liner 103 with the roughened outer peripheral surface 103a may be cast to mold integrally when the cylinder block 101 is cast with a casting mold. The casting mold includes of a bottom die 105, an upper die 107, right and left side die 109 and 111, front and rear die 113 and 115, and an ejector plate 117 installed in the upper part of the upper die 107. A bore core 107a for forming a cylinder bore 101a of the cylinder block 101 is provided at the side opposite to the bottom die 105 of the upper die 107, and the cylinder block 101 is cast and formed in a state such that the cylinder liner 103 is kept as shown in FIG. 14 on this bore core 107a.

As shown in FIG. 1 and FIG. 13, the cylinder bore part 3 of cylinder block 101 in which the cylinder liner 103 is cast, can also be surface roughened according to various previously described embodiments of the presently disclosed invention. In addition, since the outer peripheral surface 103a of the cylinder liner 103 may be roughened using the same or a similar method to that used for the cylinder bore inner surface 5 at about the same time, the joining strength of the cylinder block 101 for the cylinder liner 103 can be increased and a cylinder block 101 of high quality can be obtained.

Various embodiments of the invention have been described. These and other embodiments are within the scope of the following claims.

The invention claimed is:

1. A surface roughening method, comprising:
moving a cutting tool having a cutting head along a longitudinal axis of an article, wherein the cutting head comprises a radial cutting blade having a first cutting edge and a second cutting edge; and
rotating the cutting head about the longitudinal axis of the article such that the first cutting edge of the cutting blade forms a first machined pattern of peaks and valleys on a surface of the article, and such that the second cutting edge of the cutting blade removes at least a portion of the peaks in the first machined pattern to form uniform roughened fracture surfaces in a second machined pattern on the surface of the article, and
wherein the second machined pattern comprises an arrangement of grooves corresponding to the valleys in the first pattern and separated by lands corresponding to the uniform roughened fracture surfaces.

2. The method of claim 1, wherein
an entire cross section of each peak in the first pattern is fractured.

3. The method of claim 1, wherein
each of the grooves in the second machined pattern is symmetrical.

4. The method of claim 1, wherein
each of the grooves in the second machined pattern defines a v-shape.

5. The method of claim 1, wherein
a trailing edge of the cutting head roughens the surface of each land.

6. The method of claim 1, wherein
the article defines a cylindrical body.

7. The method of claim 6, wherein
the first cutting edge cuts an interior surface of the cylindrical body into the first machined pattern comprising a first substantially helical pattern defined by the alternating peaks and valleys, and wherein the second cutting edge creates the uniform roughened fracture surfaces on the interior surface by applying stress on the peaks to fracture at least a portion of the peaks to form the second machined pattern comprising a second substantially helical pattern defined by lands corresponding to the uniform roughened fracture surfaces, separated by grooves corresponding to the valleys.

8. The method of claim 1, wherein the article comprises a nonferrous metal.

9. The method of claim 1, further comprising applying a coating overlaying the first and second machined patterns on the surface of the article.

10. The method of claim 9, wherein the applying of the coating comprises at least one of chemical vapor deposition, plasma deposition, thermal spray coating, or fluid spray coating.

11. The method of claim 9, wherein the coating comprises an abrasion resistant material.

12. The method of claim 9, wherein the coating comprises at least one of a ceramic material or a ferrous metal.

13. The method of claim 12, wherein the ceramic material comprises one or more of silicon nitride, silicon carbide, aluminum oxide, silicon dioxide, and titanium nitride.

14. The method of claim 12, wherein the ferrous metal comprises one or more of titanium, tungsten, cobalt, nickel, iron, and aluminum.

* * * * *